United States Patent
Henn et al.

(10) Patent No.: US 11,333,522 B2
(45) Date of Patent: May 17, 2022

(54) LOCALIZATION SYSTEM

(71) Applicant: Robert Bosch GmbH, Stuttgart (DE)

(72) Inventors: Ruediger-Walter Henn, Weil der Stadt (DE); Jan Rohde, Stuttgart (DE); Michael Gabb, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 16/704,101

(22) Filed: Dec. 5, 2019

(65) Prior Publication Data

US 2020/0182645 A1 Jun. 11, 2020

(30) Foreign Application Priority Data

Dec. 6, 2018 (DE) .......................... 102018221178.7

(51) Int. Cl.
*G01C 21/36* (2006.01)
*G01C 21/28* (2006.01)
*G05D 1/02* (2020.01)

(52) U.S. Cl.
CPC ........... *G01C 21/367* (2013.01); *G01C 21/28* (2013.01); *G05D 1/0285* (2013.01); *G05D 2201/0213* (2013.01)

(58) Field of Classification Search
CPC ...... G01C 32/367; G01C 21/28; G01C 21/26; G05D 1/0285; G05D 2201/0213; G05D 1/028; G01S 5/10
See application file for complete search history.

(56) References Cited

U.S. PATENT DOCUMENTS

| | | | |
|---|---|---|---|
| 4,891,650 A | 1/1990 | Sheffer | |
| 2004/0012524 A1* | 1/2004 | Couronne | G01C 21/206 342/387 |
| 2012/0086607 A1* | 4/2012 | Ameti | G01S 5/021 342/463 |
| 2018/0038939 A1* | 2/2018 | Bruemmer | G01S 5/0289 |
| 2018/0341273 A1* | 11/2018 | Micks | B60W 30/00 |
| 2019/0049252 A1* | 2/2019 | Natroshvili | G01C 21/3446 |
| 2019/0120647 A1* | 4/2019 | Shinkar | G01C 21/367 |
| 2020/0088528 A1* | 3/2020 | Mishra | H04W 64/003 |

FOREIGN PATENT DOCUMENTS

| | | |
|---|---|---|
| DE | 102016113903 A1 | 3/2017 |
| DE | 102016221688 A1 | 5/2018 |
| WO | 2014/029492 | 2/2014 |
| WO | 2017/028994 A1 | 2/2017 |
| WO | 2017/174229 A1 | 10/2017 |

* cited by examiner

*Primary Examiner* — Rami Khatib
*Assistant Examiner* — Gabriel J Lambert
(74) *Attorney, Agent, or Firm* — Norton Rose Fulbright US LLP; Gerard Messina

(57) ABSTRACT

A localization system includes at least three locally defined locating devices whose clocks are synchronized and that receive signals of at least one vehicle; and a determination device that is configured to receive the signals of the at least one vehicle and data regarding distances of the locating devices relative to the vehicle, ascertain from the received data a surroundings model containing position data of the vehicle, and wirelessly transmit the surroundings model to the vehicle.

8 Claims, 4 Drawing Sheets

LOCALIZATION SYSTEM

CROSS-REFERENCE TO RELATED APPLICATIONS

The present application claims priority under 35 U.S.C. § 119 to DE 10 2018 221 178.7 filed in the Federal Republic of Germany on Dec. 6, 2018, the content of which is hereby incorporated by reference herein in its entirety.

FIELD OF THE INVENTION

The present invention relates to a guiding device for at least one vehicle. The present invention also relates to a guiding unit for a vehicle. The present invention also relates to a method for guiding at least one vehicle. The present invention also relates to a computer program product.

BACKGROUND

Monitoring systems based on infrastructure sensors are known. Traffic control systems based on displays are also known.

Approaches in which, for the purpose of maneuver planning, a distribution of possible trajectories of other vehicles is taken into account when planning a maneuver of the host vehicle are also known, for example from DE 10 2016 113 903 A1.

WO 2017/174229 A1 provides a method for determining a position and orientation of an at least semi-automatedly driving vehicle in the surroundings using landmarks, in which the vehicle is moved in the surroundings and a sequence of localization scenarios is generated as a result, and in which landmark data are digitally processed at least by a vehicle control system in order to determine the position and orientation of the vehicle. It is provided that the amount of landmark data according to requirements is increased or decreased as a function of the localization scenarios.

WO 2017/028994 A1 provides a method for localizing an automated motor vehicle. Provided is a specification of a localization accuracy to be attained for the automated motor vehicle during operation, localization reference data for a defined location with the defined localization accuracy to be attained being requested by the motor vehicle and being transmitted to the automated motor vehicle, surroundings data for the automated motor vehicle being detected using a sensor device of the automated motor vehicle and the detected surroundings data being linked with local information, the automated motor vehicle being localized using the localization reference data and the detected surroundings data, an attained localization accuracy being ascertained, the attained localization accuracy being signalled for the purpose of optimized transmission of the localization reference data with respect to the localization accuracy to be attained.

WO 2014/029492 A1 provides a method for controlling an autonomous vehicle system and motor vehicle, where, from an instantaneous position of the motor vehicle and at least one piece of location-related information describing the local information, a piece of setting information for the vehicle system is ascertained relating to the permission information for the legality of the utilization of the vehicle system and at least one operating parameter of the vehicle system is selected as a function of the piece of setting information.

SUMMARY

An object of the present invention is to provide a device for improved guiding of vehicles.

The object is achieved, according to a first aspect, by a localization system that includes: at least three locally defined locating devices, clocks of the locating devices being synchronized and signals of at least one vehicle being able to be received by the locating devices; and a determination device configured to receive the signals of the at least one vehicle and data regarding distances of the locating devices with respect to the vehicle, to determine from the received data a surroundings model containing position data of the vehicle, and to wirelessly transmit the surroundings model to the vehicle.

In this way, a local positioning system including locally defined localization devices is provided, the clocks of the localization devices being synchronized with one another, as a result of which distances of the localization devices with respect to the vehicle can be ascertained very accurately. As a result, a very accurate positioning of the vehicle in the local surroundings can be ascertained using the determination device.

The object is achieved, according to a second aspect, by a localization device for a vehicle, the device including: a transmitting device for transmitting a signal to at least three locating devices; a receiving device for wirelessly receiving localization data of a localization system, which data have been generated from the signal and from distances of the locating devices with respect to the vehicle; and a display device for displaying the localization data.

The object is achieved, according to a third aspect, by a method for localizing at least one vehicle, the method including: synchronizing at least three locating devices in time; transmitting a signal of the vehicle to the locating devices; transmitting distance data of the vehicle from the locating devices to a determination device; ascertaining a surroundings model using the determination device; and wirelessly transmitting to the vehicle the surroundings model containing position data of the vehicle.

As a result, a highly accurate, server-based localization system for vehicles is provided.

In an example embodiment of the localization system, data of a surroundings sensor device of the at least one vehicle is compared with the position data of the surroundings model. In this way, data of a surroundings sensor device of the vehicle are used and are compared and in this way can be used to ascertain position data of further objects.

In an example embodiment of the localization system, the localization system includes at least four locating devices. In this way, highly accurate, three-dimensional position data of the vehicle can advantageously be ascertained.

In an example embodiment of the localization system, the position data of the at least one vehicle are displayable using a digital map. An optimal representation of the position of the vehicle can thus advantageously be provided.

In an example embodiment of the method, data of a surroundings sensor device of the vehicle are transmitted to the determination device and are compared with the localization data of the surroundings model.

The present invention will be described in greater detail below with further features and advantages, with reference to multiple figures. All features described or shown form, alone or in any combination, the subject matter of the present invention, regardless of the recitations in the patent claims or their back-reference, and also regardless of their wording or representation in the description or in the figures.

Features and advantages of the localization system and of the localization device arise in an analogous manner from features and advantages of the method, and vice versa.

DETAILED DESCRIPTION

Below, a vehicle means a manually controlled vehicle, a semi-automated vehicle, or a fully automated (autonomous) vehicle.

Example embodiments of the present invention are directed to an improved method and device for localizing at least one vehicle.

Compared to known GNSS systems (Global Navigation Satellite Systems), a localization system according to the present invention has an advantage that it enables a highly precise self-localization based on earthbound, local receivers using a relative, locally known time base in local surroundings.

Signals from vehicles which each has one transmitter are locally always available since, due to the earthbound configuration of the locating devices, no obscuring of satellites, jitter signals, or atmospheric and other interferences occur. Advantageously, there is also no need for high-precision clocks, as are required in the case of GNSS satellites, since the clocks of the locating devices need only be synchronized over a short time period and over local surroundings (for example an intersection, typical distance of around 500 m). In this way, a local receiver navigation system is formed.

Advantages of the provided localization system 200 over known GNSS systems are thus, in particular:
- no obscuring of satellite signals;
- no ionospheric or tropospheric delays or interferences;
- no errors due to inaccurate satellite positions;
- no deliberate interference of GNSS signals; and
- no different/unfavorable geometric distribution of satellites By virtue of the provided local, server-based approach, determination device 100 can be connected to a backend via the Internet and can receive instantaneous map layers, for example including dynamic map layers showing traffic jams, roadworks, public transportation timetables, etc. Up-to-date map information can thus always be used for geo-referencing. In addition, the localization of multiple vehicles at the same time can be carried out using determination device 100.

Determination device 100 can receive, via additional communication networks (for example LTE, WLAN, etc.), information for self-localization of the vehicles based on on-board sensor-assisted localization.

Determination device 100 can also receive, via additional communication networks (for example LTE, WLAN, etc.), information regarding positions of other dynamic objects (for example vehicles), which the vehicle can localize on the basis of its on-board sensors.

Based on the above-mentioned information sources (transmitter signals to locating devices, self-localization of the transmitters, and localization of other dynamic objects by the transmitters based on on-board sensors of the vehicles), determination device 100 can create a consistent surroundings model containing position data. Based on the above-described information sources, Kalman filters or similar methods for example can be used to optimize the object positions of the surroundings model.

Figure 1:
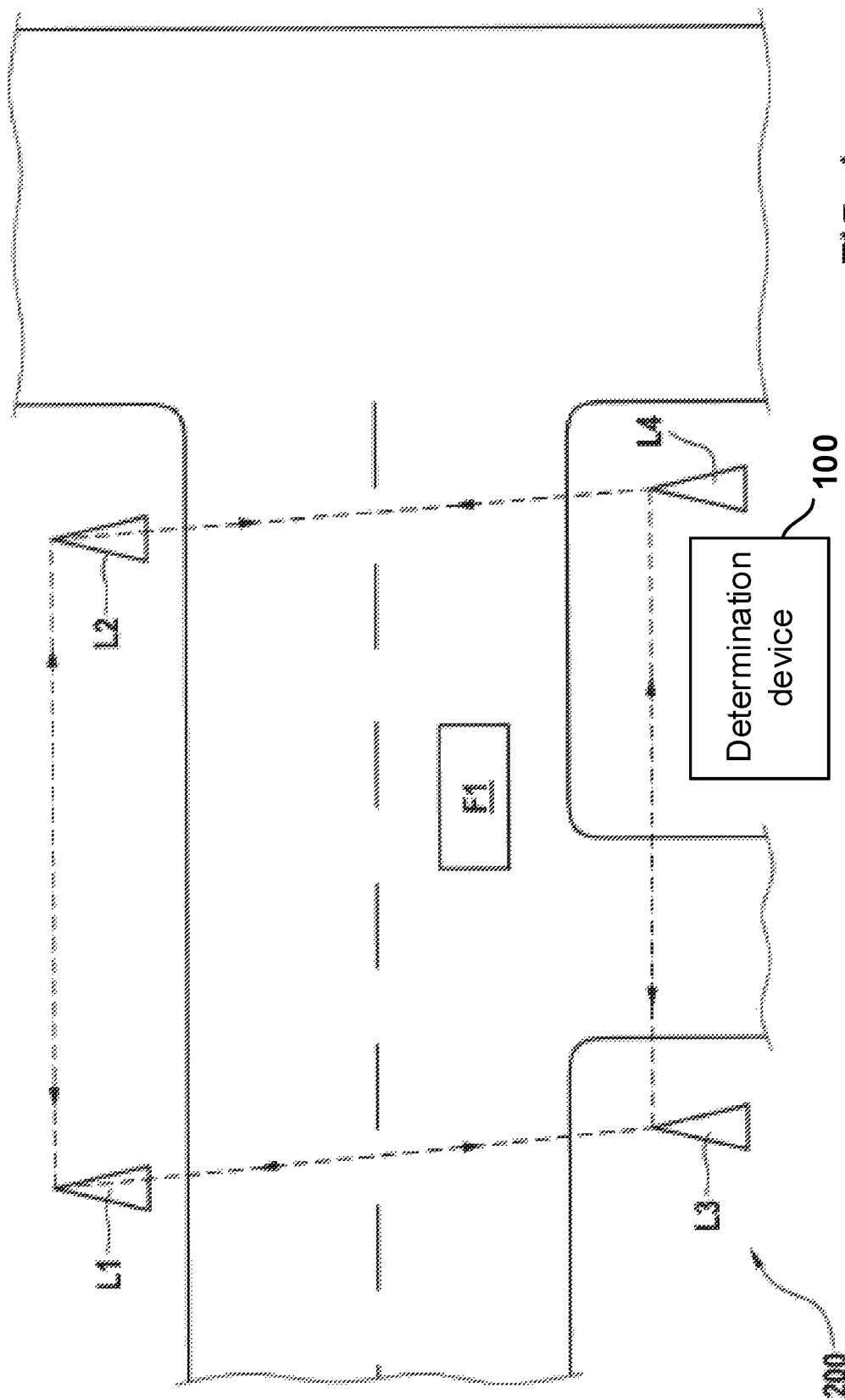
FIG. 1 shows a basic illustration of an example embodiment of a localization system.

FIG. 1 shows an overview image to explain an operating mode of the provided method. Four local locating devices L1 . . . L4 are apparent, the geodetic positions or localization data of which are precisely known because they are measured with high accuracy, for example in the millimeter range, preferably using geodetic methods. For exact synchronization, locating devices L1 . . . L4 transmit reference time signals together with associated identification information to all other locating devices L1 . . . L4. Based on the known positions and thus distances of locating devices L1 . . . L4 with respect to one another, locating devices L1 . . . L4 can be exactly synchronized with one another due to the propagation time differences that are to be expected.

By way of example, locating device L1 transmits, at point in time t1, a reference time signal together with associated piece of identification information, to the other locating devices L2 . . . L4. After a time $dt_{1\_2} = x_{1\_2}/c$ (c=speed of light), the reference time signal of locating device L1 is received by locating device L2. Propagation time difference $dt_{1\_2}$ between locating devices L1, L2 is precisely known due to the known distance of locating devices L1, L2 with respect to each other. Locating device L2 can thus precisely synchronize its own clock with the clock of locating device L1. This takes place in the same way with locating devices L3, L4 and all other locating devices (not shown).

For precise localization of a vehicle F1 including a transmitter, at least three locating devices L1 . . . Ln are required. If there is a minimum number of at least four locating devices L1 . . . Ln, advantageously a precise three-dimensional localization of vehicles can be carried out.

The explained synchronization method can be carried out cyclically, for example, by all locating devices L1 . . . Ln, for example every 10 ms.

The synchronization signals of locating devices L1 . . . Ln are also received by a vehicle F1 including a transmitter, which very precisely knows, on the basis of a digital map, the positions of locating devices L1 . . . L4. In order to enhance the accuracy of the synchronization, this method can be carried out alternately by all locating devices L1 . . . Ln. A sufficiently exact time base for the position of objects (for example vehicles) between locating devices L1 . . . Ln can thus be achieved on the basis of propagation time measurements.

A transmitter of vehicle F1 transmits a cyclic signal to mutually synchronized locating devices L1 . . . L4. Based on the time difference of the signal reaching locating devices L1 . . . L4, the position of vehicle F1 can be ascertained using triangulation methods that are known per se. Using a digital map, on which the positions of locating devices L1 . . . L4 are plotted, local determination device 100 can geo-reference or locally precisely localize vehicle F1.

Figure 2:
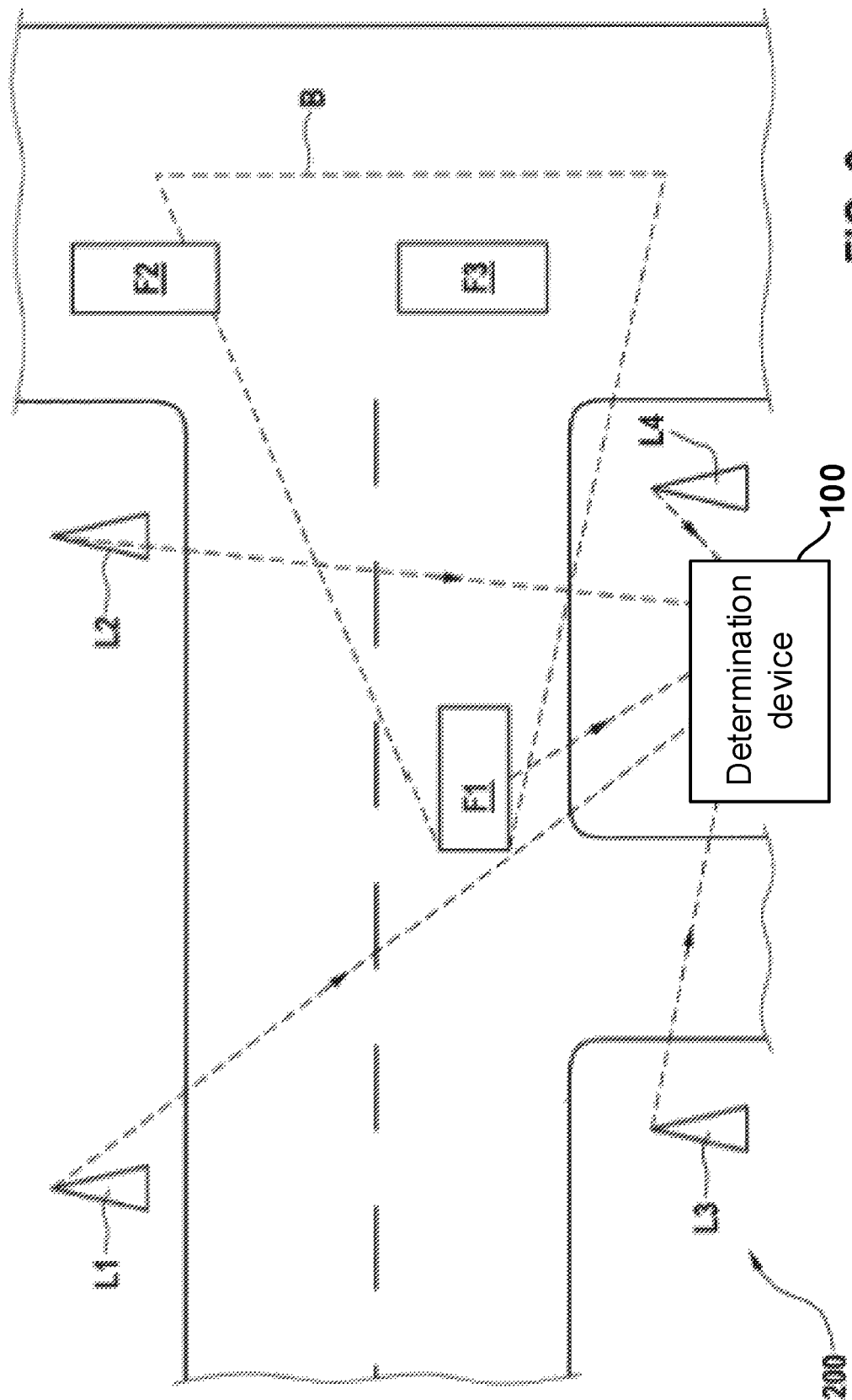
FIG. 2 shows another basic illustration of an example embodiment of the localization system.

It is indicated in FIG. 2 that vehicle F1, using its on-board surroundings sensors, detects other static and dynamic objects, such as other vehicles F2, F3 for example, in a detection range B and transmits these data to determination device 100. Determination device 100 compares the transmitted data with the position data of the surroundings model, as a result of which a highly precise localization of vehicles F2, F3 can be achieved. Based on a digital map, these objects can be geo-referenced.

In addition, by detecting and localizing static landmarks, vehicle F1 can self-localize.

Vehicle F1 . . . Fn, including the transmitter, transmits the information regarding its own position and regarding the positions of other dynamic objects via a communication network (for example WLAN, LTE, etc.) to local determination device 100.

Local determination device 100 uses the information from local locating devices L1 . . . Ln to localize vehicle F1, and also the information from the vehicles regarding their own positions and the positions of other dynamic objects, which has been transmitted via a communication network to determination device 100, to create a consistent localization model of the local surroundings. To create the consistent localization model of the local surroundings, determination device 100 uses methods that are known per se, such as Kalman filtering and/or Bayesian filtering for example.

The consistent localization model containing the geo-referenced positions of vehicles F1 . . . F3 and of other dynamic objects is transmitted by determination device 100, via the additional communication device, to vehicles F1 . . . F3.

All vehicles F1 . . . F3 including the transmitters in the local surroundings thus use the same consistent surroundings or localization model of determination device 100.

As a result, a highly precise and cost-effective, server-based localization method can in this way be implemented.

The present invention thus achieves a highly precise self-localization of a transmitter in a vehicle in local surroundings (for example an intersection, complex urban surroundings) using at least three locating devices L1 . . . Ln. The absolute positions of the locating devices in 3D coordinates are known, locating devices L1 . . . Ln using a relative time base and being synchronized with one another. Locating devices L1 . . . Ln receive a signal from vehicle F1 . . . Fn to be positioned and are all connected to local determination device 100.

Based on the differences of the signals reaching locating device L1 . . . Ln, the relative positions of vehicles F1 . . . Fn with respect to locating devices L1 . . . Ln are thus calculated using triangulation, and the vehicle including the transmitter geo-references these using a digital map, on which the positions of locating devices L1 . . . Ln are plotted.

Figure 3:
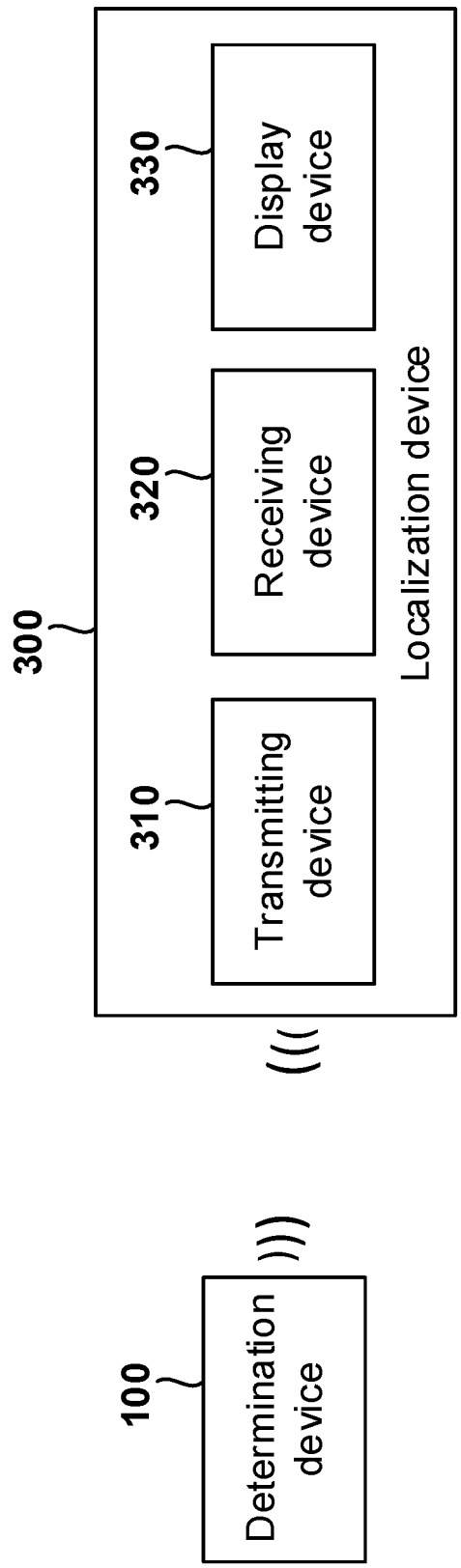
FIG. 3 is a block diagram of an example embodiment of a localization device.

FIG. 3 shows a basic block diagram of an example embodiment of a provided localization device 300 for a vehicle F1 . . . Fn. A transmitting device 310 is apparent, which transmits signals to locating devices L1 . . . Ln in the manner explained above. Also apparent is a receiving device 320 that is functionally connected to transmitting device 310 and that receives the surroundings or localization model containing the position data that has been determined in the manner explained above. Also apparent is a display device 330 (for example vehicle display) that is functionally connected to receiving device 320 and on which the surroundings or localization model containing the position data can be displayed. A digital map provided for localization device 300 is not shown in FIG. 3.

Figure 4:
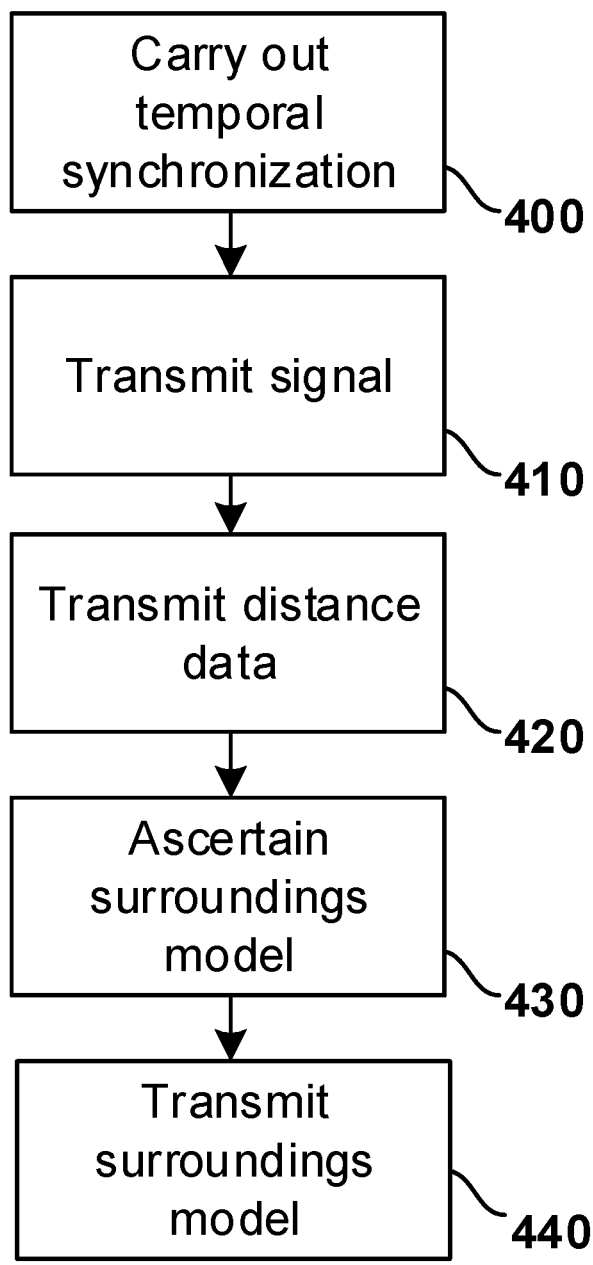
FIG. 4 is a flowchart of an example embodiment of the provided method for localizing at least one vehicle.

FIG. 4 is a basic flowchart of a method for localizing at least one vehicle F1 . . . Fn. In a step 400, a temporal synchronization of at least three locating devices L1 . . . Ln is carried out. In a step 410, a signal is transmitted from vehicle F1 . . . Fn to locating devices L1 . . . Ln. In a step 420, distance data of vehicle F1 . . . Fn are transmitted by locating devices L1 . . . Ln to a determination device 100. In a step 430, a surroundings model is ascertained using determination device 100. In a step 440, the surroundings model containing positioning data of vehicle F1 . . . Fn is wirelessly transmitted to vehicle F1 . . . Fn.

Advantageously, the method according to the present invention can be implemented as software that runs for example on electronic determination device 100. Easy adaptability of the method is in this way advantageously assisted.

As a result, using the provided method, a level of road traffic safety can advantageously be enhanced and a homogeneous traffic flow can be provided.

Those skilled in the art will suitably modify and/or combine the features of the present invention without departing from the core of the present invention.

What is claimed is:

1. A localization system, comprising:
at least three locating devices having clocks, which are synchronized with one another, and that are configured to receive signals of at least one vehicle; and
a local determination device having a processor, configured to perform the following:
receiving the signals of the at least one vehicle and data regarding distances of the locating devices relative to the at least one vehicle;
ascertaining, based on the received data, a surroundings model containing position data of the at least one vehicle; and
wirelessly transmitting the surroundings model to the at least one vehicle;
wherein geodetic positions of the locating devices are measured with high accuracy in a millimeter range to provide known positions of the locating devices,
wherein for the synchronization, the locating devices transmit reference time signals with associated identification information to all of the locating devices, wherein based on the known positions and thus distances of the locating devices with respect to one another, the locating devices are synchronized with one another due to propagation time differences,
wherein the synchronization signals of the locating devices are received by the vehicle including a transmitter, which knows, based on a digital map, the known positions of the locating devices, and wherein a time base for positions of objects between the locating devices is achieved based on propagation time measurements, and
wherein the local determination device uses the information from the locating devices to localize the vehicle, and position information from at least another vehicle and/or at least another dynamic object position, which has been transmitted via a communication network to the determination device, to create the surroundings model.

2. The localization system of claim 1, wherein the local determination device is configured to compare data of a surroundings sensor device of the at least one vehicle to the position data of the surroundings model.

3. The localization system of claim 1, wherein the at least three locating devices includes at least four locating devices.

4. The localization system of claim 1, wherein the position data of the at least one vehicle are displayable using a digital map.

5. A localization device for localization of a vehicle, comprising:
a transmitter to transmit a signal to at least three locating devices;

a receiver to wirelessly receive localization data of a localization system which have been generated from the signal and from distances of the locating devices relative to the vehicle; and a display to display the localization data via the display;

wherein the localization system, includes:

the at least three locating devices having clocks, which are synchronized with one another, and that are configured to receive signals of at least one vehicle; and a local determination device having a processor, configured to perform the following:

receiving the signals of the at least one vehicle and data regarding distances of the locating devices relative to the at least one vehicle;

ascertaining, based on the received data, a surroundings model containing position data of the at least one vehicle; and wirelessly transmitting the surroundings model to the at least one vehicle;

wherein geodetic positions of the locating devices are measured with high accuracy in a millimeter range to provide known positions of the locating devices, wherein for the synchronization, the locating devices transmit reference time signals with associated identification information to all of the locating devices, wherein based on the known positions and thus distances of the locating devices with respect to one another, the locating devices are synchronized with one another due to propagation time differences, wherein the synchronization signals of the locating devices are received by the vehicle including a transmitter, which knows, based on a digital map, the known positions of the locating devices, and wherein a time base for positions of objects between the locating devices is achieved based on propagation time measurements, and wherein the local determination device uses the information from the locating devices to localize the vehicle, and position information from at least another vehicle and/or at least another dynamic object position, which has been transmitted via a communication network to the determination device, to create the surroundings model.

6. A method for localizing a vehicle, the method comprising:

synchronizing at least three locating devices with respect to time;

transmitting a signal of the vehicle to the locating devices;

transmitting distance data to a local determination device, wherein the distance data regards respective distances of the vehicle from the locating devices;

ascertaining a surroundings model using the local determination device; and wirelessly transmitting the surroundings model to the vehicle, wherein the surroundings model contains position data of the vehicle;

wherein geodetic positions of the locating devices are measured with high accuracy in a millimeter range to provide known positions of the locating devices, wherein the for synchronization, the locating devices transmit reference time signals with associated identification information to all of the locating devices, wherein based on the known positions and thus distances of the locating devices with respect to one another, the locating devices are synchronized with one another due to propagation time differences, wherein the synchronization signals of the locating devices are received by the vehicle including a transmitter, which knows, based on a digital map, the known positions of the locating devices, and wherein a time base for positions of objects between the locating devices is achieved based on propagation time measurements, and wherein the local determination device uses the information from the locating devices to localize the vehicle, and position information from at least another vehicle and/or at least another dynamic object position, which has been transmitted via a communication network to the determination device, to create the surroundings model.

7. The method of claim 6, further comprising:

comparing, using the local determination device, data of a surroundings sensor device of the vehicle to localization data of the surroundings model.

8. A non-transitory computer-readable medium, having a computer program, which is executable by a processor, comprising:

a program code arrangement having program code for localizing a vehicle, by performing the following:

synchronizing at least three locating devices with respect to time;

transmitting a signal of the vehicle to the locating devices;

obtaining distance data from the locating devices, wherein the distance data regards respective distances of the vehicle;

ascertaining a surroundings model; and wirelessly transmitting the surroundings model to the vehicle, wherein the surroundings data contains position data of the vehicle;

wherein geodetic positions of the locating devices are measured with high accuracy in a millimeter range to provide known positions of the locating devices, wherein for the synchronization, the locating devices transmit reference time signals with associated identification information to all of the locating devices, wherein based on the known positions and thus distances of the locating devices with respect to one another, the locating devices are synchronized with one another due to propagation time differences, wherein the synchronization signals of the locating devices are received by the vehicle including a transmitter, which knows, based on a digital map, the known positions of the locating devices, and wherein a time base for positions of objects between the locating devices is achieved based on propagation time measurements, and wherein the local determination device uses the information from the locating devices to localize the vehicle, and position information from at least another vehicle and/or at least another dynamic object position, which has been transmitted via a communication network to the determination device, to create the surroundings model.

* * * * *